United States Patent
Berner

(10) Patent No.: US 11,856,310 B2
(45) Date of Patent: Dec. 26, 2023

(54) DELAY EQUALIZATION IN EVENT-BASED VISION SENSORS

(71) Applicant: Sony Advanced Visual Sensing AG, Schlieren (CH)

(72) Inventor: Raphael Berner, Confignon (CH)

(73) Assignee: Sony Advanced Visual Sensing AG, Schlieren (CH)

( * ) Notice: Subject to any disclaimer, the term of this patent is extended or adjusted under 35 U.S.C. 154(b) by 18 days.

(21) Appl. No.: 17/629,488

(22) PCT Filed: Sep. 1, 2020

(86) PCT No.: PCT/IB2020/058143
§ 371 (c)(1),
(2) Date: Jan. 24, 2022

(87) PCT Pub. No.: WO2021/044299
PCT Pub. Date: Mar. 11, 2021

(65) Prior Publication Data
US 2022/0272296 A1    Aug. 25, 2022

Related U.S. Application Data

(60) Provisional application No. 62/895,709, filed on Sep. 4, 2019.

(51) Int. Cl.
H04N 25/77  (2023.01)
H04N 25/50  (2023.01)
H04N 25/75  (2023.01)
H04N 25/47  (2023.01)

(52) U.S. Cl.
CPC ............. *H04N 25/77* (2023.01); *H04N 25/47* (2023.01); *H04N 25/50* (2023.01); *H04N 25/75* (2023.01)

(58) Field of Classification Search
CPC ........ H04N 25/47; H04N 25/75; H04N 25/77; H04N 25/50
See application file for complete search history.

(56) References Cited

U.S. PATENT DOCUMENTS

| | | | |
|---|---|---|---|
| 7,728,269 B2 | 6/2010 | Lichtsteiner et al. | |
| 2008/0135731 A1 | 6/2008 | Lichtsteiner et al. | |
| 2014/0326854 A1 | 11/2014 | Delbruck et al. | |
| 2018/0189959 A1 | 7/2018 | Berner et al. | |
| 2018/0191972 A1 | 7/2018 | Berner et al. | |
| 2022/0108551 A1* | 4/2022 | Athreya | H04N 25/00 |

FOREIGN PATENT DOCUMENTS

| | | |
|---|---|---|
| EP | 3 576 404 A1 | 4/2019 |
| WO | WO 2018122798 A1 | 7/2018 |
| WO | WO 2018122800 A1 | 7/2018 |
| WO | WO 2019/087472 A1 | 5/2019 |

OTHER PUBLICATIONS

International Search Report and Written Opinion of the International Searching Authority, dated Oct. 21, 2020, from International Application No. PCT/IB2020/058143, filed on Sep. 1, 2020. 13 pages.

International Preliminary Report on Patentability, dated Mar. 17, 2022, from International Application No. PCT/IB2020/058143, filed on Sep. 1, 2020. 8 pages.

* cited by examiner

*Primary Examiner* — Nicholas G Giles
(74) *Attorney, Agent, or Firm* — HoustonHogle LLP

(57) ABSTRACT

An event based pixel sensor system employing delay equalization between differently illuminated pixels.

3 Claims, 6 Drawing Sheets

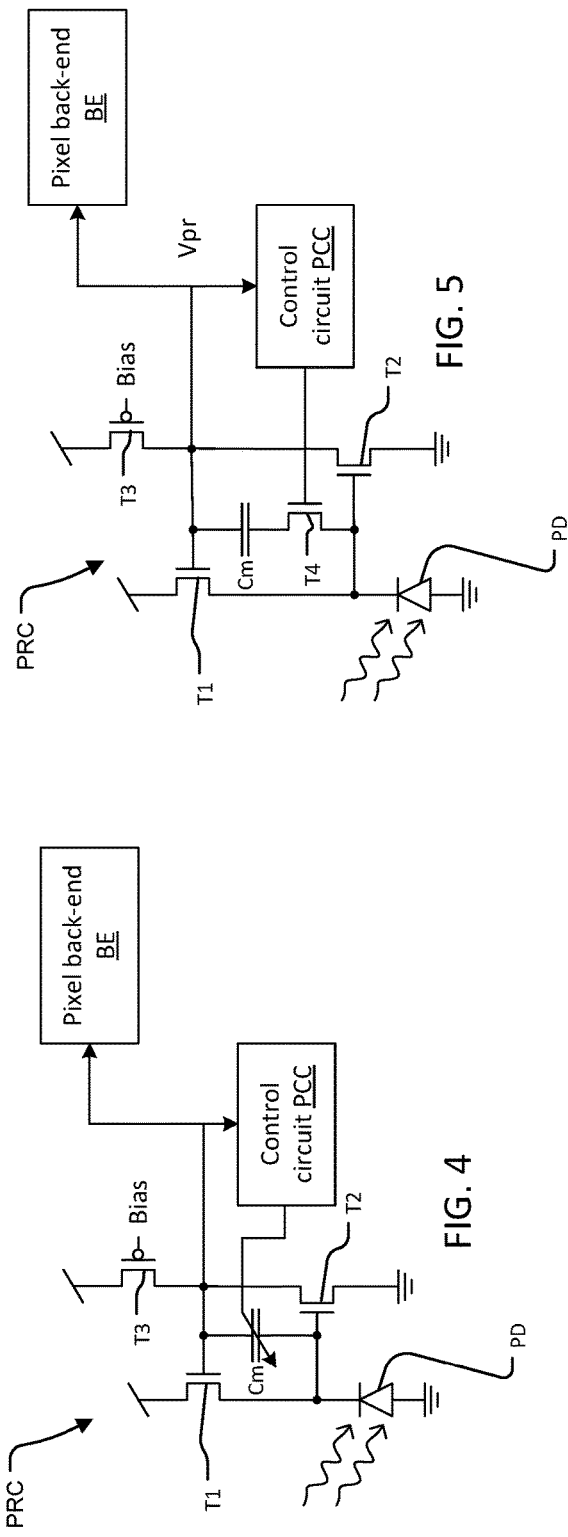
FIG. 4
FIG. 5
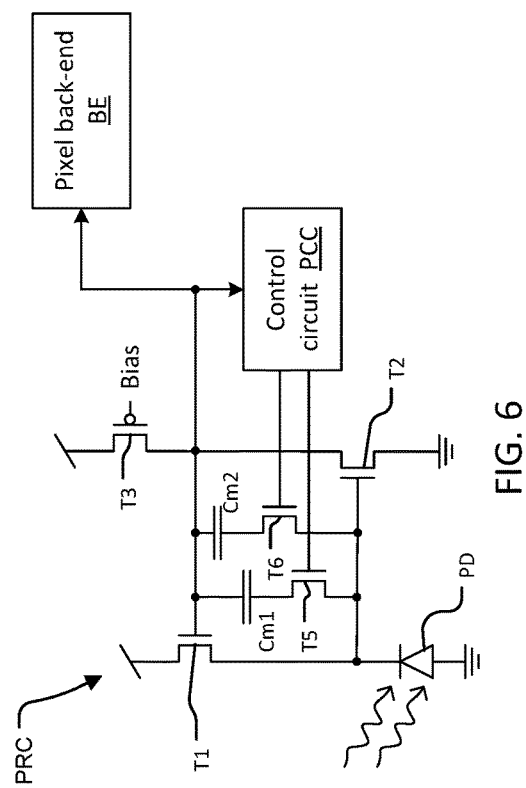
FIG. 6

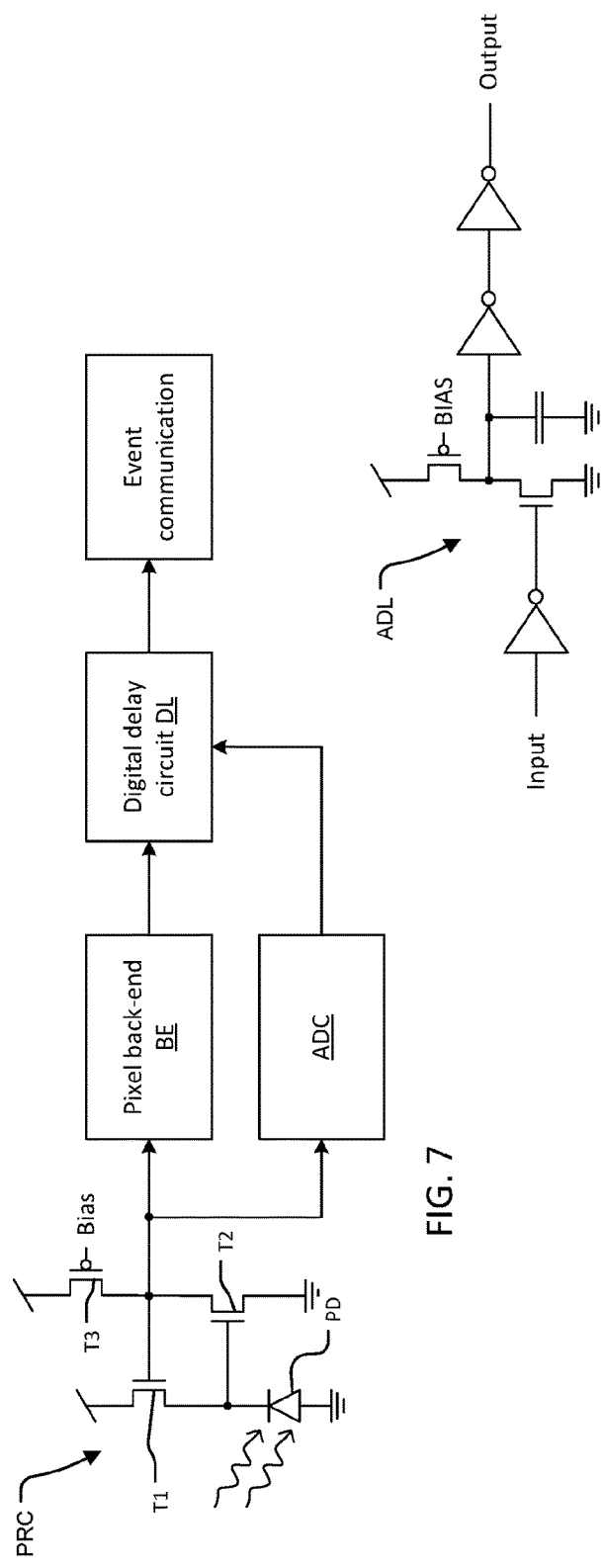
FIG. 7
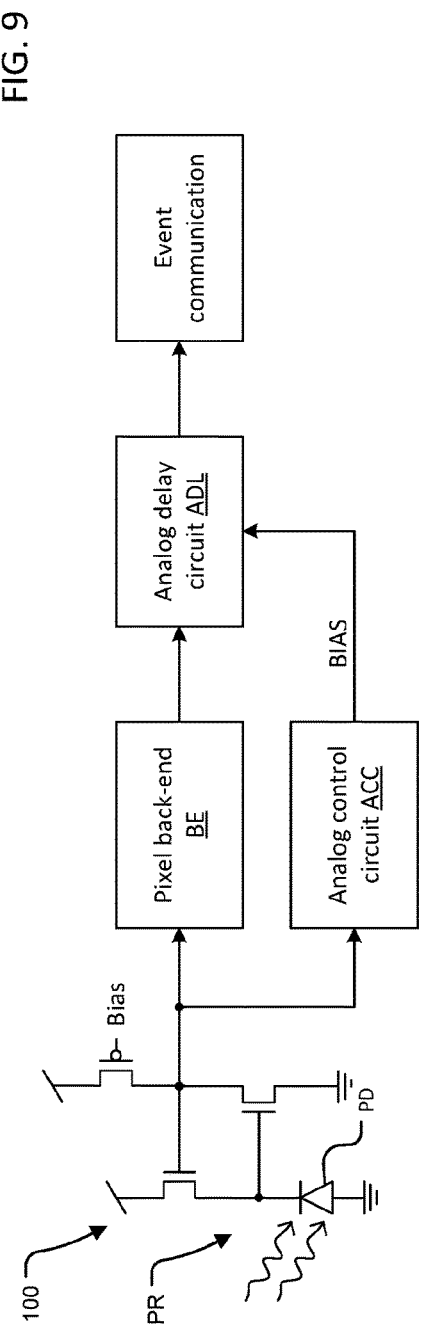
FIG. 9
FIG. 8

DELAY EQUALIZATION IN EVENT-BASED VISION SENSORS

RELATED APPLICATIONS

This application is a § 371 National Phase Application of International Application No. PCT/IB2020/058143, filed on Sep. 1, 2020, now International Publication No. WO 2021/044299 A1, published on Mar. 11, 2021, which International Application claims the benefit under 35 USC 119(e) of U.S. Provisional Application No. 62/895,709, filed on Sep. 4, 2019, both of which are incorporated herein by reference in their entirety.

BACKGROUND OF THE INVENTION

Today, machine vision is mostly based on conventional cameras and their associated frame-based, spatially resolved optical sensors. For some machine vision tasks, e.g., object recognition, these conventional frame-based cameras, with their image-based optical sensors, are well suited. However, for other tasks, e.g., monitoring, tracking or position and motion estimation, the conventional image sensors have drawbacks.

The main drawback is that conventional cameras produce a significant amount of redundant and unnecessary data, which has to be captured, communicated and processed. This high data load slows down the reaction time by decreasing temporal resolution, results in increased power consumption, and increases the size and cost of machine vision systems. In addition, most image sensors suffer from limited dynamic range, poor low-light performance and motion blur.

On the other hand, so-called Dynamic Vision Sensors (DVS) overcome the limitations of frame-based encoding. See U.S. Patent Application Publication No. US 2008/0135731, by Lichtsteiner et al., entitled "Photoarray for Detecting Time-Dependent Image Data", which is incorporated herein by this reference. These spatially-resolved optical sensors use in-pixel data compression to remove data redundancy. They can also achieve high temporal resolution, low latency, low power consumption, and high dynamic range with little motion blur. The DVS-type of optical sensor is thus well suited, especially for solar or battery powered compressive sensing or for mobile machine vision applications where the position of the system has to be estimated and where processing power is limited due to limited battery capacity.

The DVS pre-processes visual information locally. Instead of generating crisp images, the DVS produces smart data for computer applications. While conventional image sensors capture a movie as a series of still images, the DVS detects and only transmits the position of changes in a scene. It encodes the visual information much more efficiently than conventional cameras by employing in-pixel data compression. This means that processing of data is possible using fewer resources, lower net power and with faster system reaction time. The high temporal resolution allows continuously tracking visual features and thereby overcoming the correspondence problem. Additionally, the architecture of DVS allows for high dynamic range and good low-light performance.

Event-based vision sensors (EBVS) are often but not always variants of the original DVS architectures. As a general rule, the pixels of (EBVS's) operate asynchronously at least in portions of their pixels without a periodic sampling rate and emit a so-called DVS address event as soon as they perceive a luminance change exceeding an adjustable threshold. In other examples, they produce binary (or ternary) images. ON events are associated with an increase in luminance exceeding the threshold; and OFF events are associated with a decrease in luminance exceeding the threshold at a given pixel.

SUMMARY OF THE INVENTION

Event-based vision sensor pixels will typically use a logarithmic front-end circuit. The front-end pixel capacitance (sometimes designated Cm) is usually an unavoidable parasitic capacitance. As a consequence, they generally experience a delay from light input change to event generation. Other parasitic capacitances can influence the delay as well. Generally, the delay is inversely proportional to the current in the photodiode, and proportional to Cm. For a fixed voltage over the photodiode, the current in the photodiode is proportional to the light intensity falling on each pixel. As a result, there are different delays between pixels that are illuminated differently, and this can pose difficulties in the software processing of data, especially when other sensors such as an inertial measurement unit (IMU) are involved.

The present invention concerns equalizing the delays between differently illuminated pixels.

In general, according to one aspect, the invention features an event based pixel sensor. It comprises an event-based pixel array for detecting events associated with changes in illumination and one or more circuits that equalize the delays between pixels.

Often, the delay circuits apply different amounts of delay based on levels of illumination received by the corresponding pixels. For example, the delays might be increased based on increases in the illumination received by the corresponding pixels.

In some examples, the delay circuits include a controlled capacitance in each of the pixels.

In other examples, the delay circuits include a digital delay circuit or an analog delay circuit.

In other examples, the delay circuits can include a delay block that applies delays to event data readout from the event based pixel array. Here, the delay block could be controlled based on gray scale image readout from the event based pixel array.

In general, according to another aspect, the invention features a method of operation of an event-based pixel sensor, the method comprising detecting events associated with changes in illumination in an event-based pixel array and equalizing the delays between pixels.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 4, 5, and 6 are circuit diagrams showing front end circuits for pixels, according to the present invention.

FIGS. 7 and 8 are circuit diagrams showing front end circuits for pixels with delay circuits, according to the present invention.

FIG. 9 is circuit diagram showing an exemplary delay circuit.

DETAILED DESCRIPTION OF THE PREFERRED EMBODIMENTS

Figure 1:
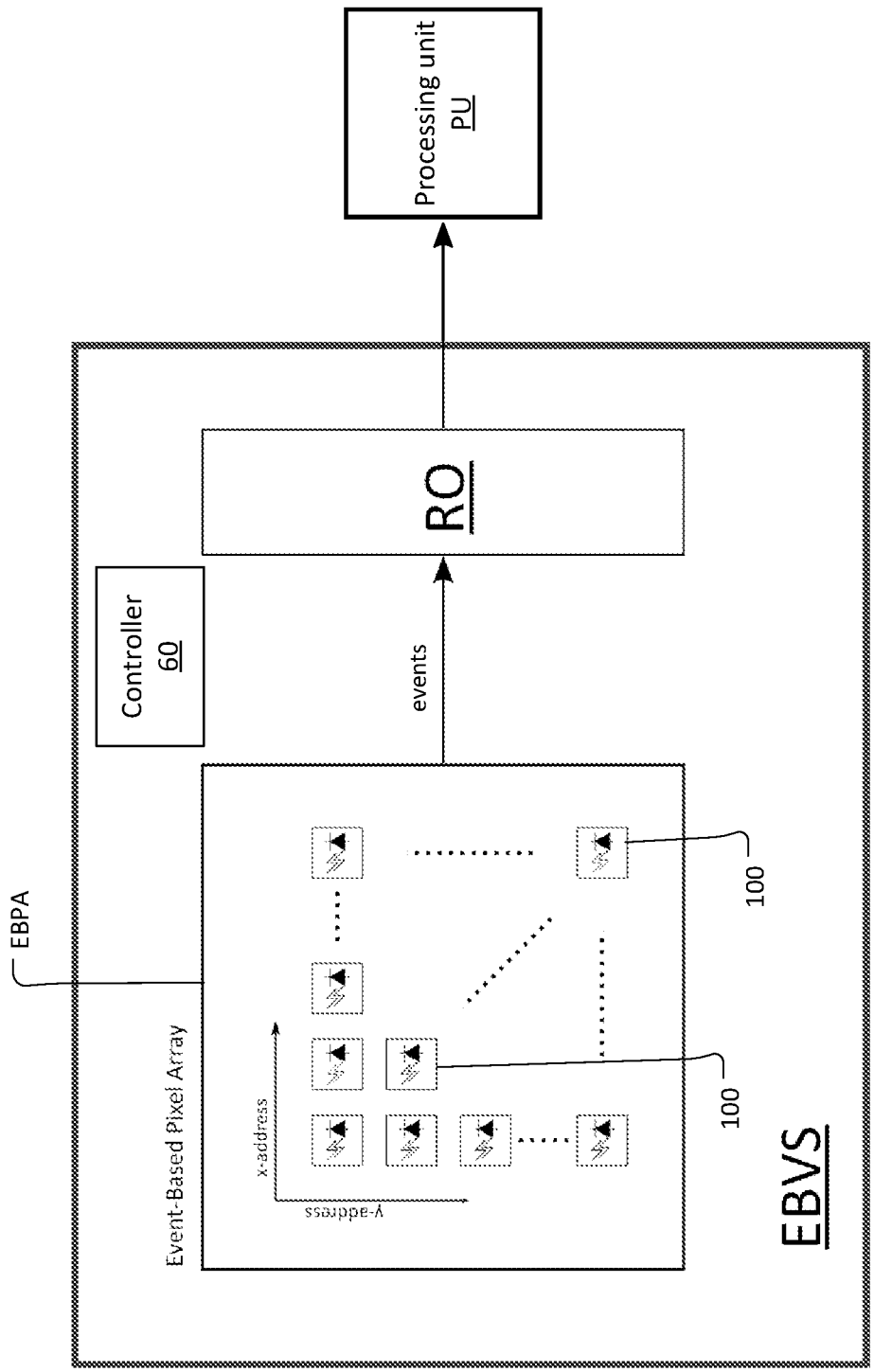
FIG. 1 is a block diagram showing a state-of-the-art event-based image sensor: the sensor generates data (events) from the light detection pixel array associated with changes in the illumination of pixels and transmits this data outside; typically, a processing unit that receives and saves the data is also the device that performs the elaboration on the same data.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Definitions

An Event-Based Pixel Array (EBPA) is an array of pixels containing photo-sensitive devices and pixel circuits that take as input the output signal of the photo-sensitive devices; these pixels (combining photosensitive devices and pixel circuits), spatially and/or temporally independently from each other, generate discretized data as function of the light radiation by which they are hit.

An Event-Based Vision Sensor (EBVS) is a sensor that outputs data extracted and/or elaborated from an EBPA.

Read-out Circuit (RO): circuitry that extracts events (or event data) from an event-based pixel array EBPA.

Pixel Address (k): number, or list of numbers, that represents the position of a pixel in a pixel array.

Memory Address (m): number, or list of numbers, that represent a location in a memory and that can be used to access that location of the memory for reading or writing data.

State-of-the-Art

FIG. 1 shows a state-of-the-art for event-based vision sensor EBVS. It comprises an event-based pixel array EBPA of pixel circuits 100, a controller 60 for controlling the EBPA, and a read-out circuitry RO that reads the events generated by the array EBPA and outputs them to the external processing unit, in the form of an event data stream. This data stream is typically received by the processing unit PU (e.g. CPU, microcontroller, digital signal processor (DSP)) that is saving this data in a memory, which will then be accessed to perform data elaboration, typically by the same processing unit that received the data in the first place. Often, the event data received from the sensor EBVS has to be elaborated by the processing unit PU before being saved to the memory, to convert it to a format compatible with the memory or with the subsequent elaboration steps.

The event data is often in the form of the pixel addresses of the pixels 100 that detected a light change. Each of these pixel addresses encodes the position of a pixel in the array, in the form of two numbers representing x-y coordinates. This event data is sent to the processing device PU. In some cases, there is an explicit (such as one-to-one) mapping between pixel addresses and memory addresses of the memory maintained by the processing unit.

Figure 2:
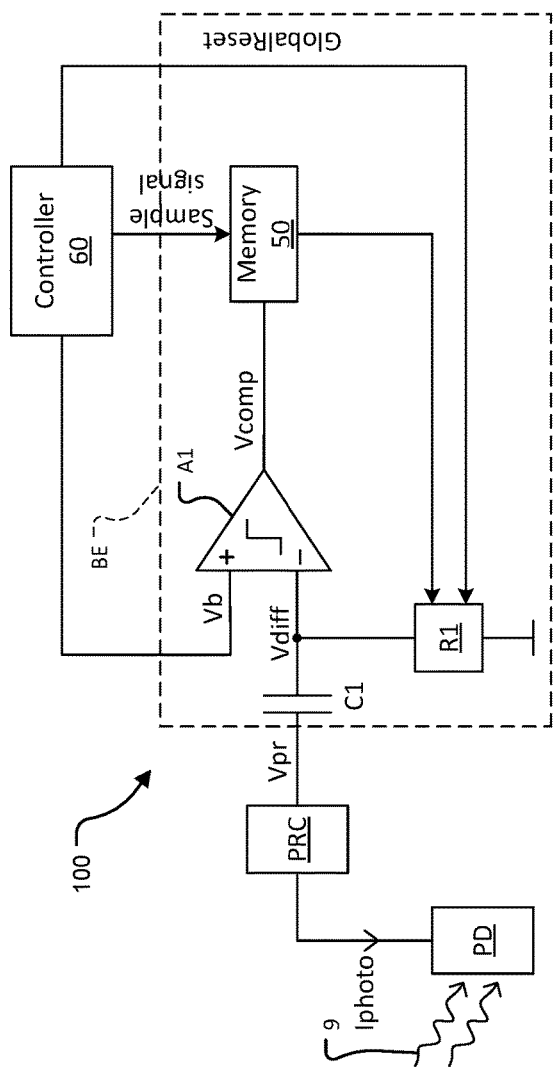
FIG. 2 is a circuit diagram showing a state of the art pixel implementation for an event-based image sensor, e.g. according to PCT/IB2017/058526 (International Pub. No. WO 2018/122798 A1, which is incorporated herein by this reference in its entirety) and U.S. Pub. No. US 2018/0191972 A1, which is incorporated herein by this reference in its entirety, or U.S. Pat. No. 7,728,269 B2, which is incorporated herein by this reference in its entirety.

FIG. 2 shows an example of a pixel of the EBPA of an EBVS in the above described system. It is taken from PCT/IB2017/058526 and U.S. Pub. No. 2018/0191972, which is incorporated herein by this reference in its entirety. However, the core concepts in the proposed invention can be applied to virtually any Event-Based Vision Sensor realized as an integrated circuit, not depending on any specific pixel architecture used, such as the specific pixel architecture described below.

The major components of a pixel circuit are enumerated below.

A frontend of the pixel circuit 100 is usually an analog circuit. The frontend comprises a photodiode PD, or other photosensor, to measure impinging light 9 and convert the light intensity to current Iphoto; a photoreceptor circuit PRC to generate a photoreceptor signal Vpr dependent on the light intensity; and a memory capacitor C1 to remember past photoreceptor signal.

The memory capacitor C1 receives the photoreceptor signal Vpr such that first plate of the capacitor carries a charge that is responsive to the photoreceptor signal Vpr and thus the light received by the photosensor PD and connects the frontend to the pixel's backend BE, which operates in a more digital domain.

A second plate of the memory capacitor C1 is connected to the comparator node (inverting input) of a comparator A1. Thus the voltage of the comparator node, Vdiff, varies with changes in the photoreceptor signal Vpr.

The comparator A1 compares the difference between current photoreceptor signal Vpr and past photoreceptor signal to a threshold, supplied by the controller 60, and is part of the event detector. This comparator A1 can be in each pixel, or shared between a subset (for example a column) of pixels. In the preferred embodiment the comparator will be integral to the pixel, with each pixel having a dedicated comparator A1.

A pixel memory 50 stores the comparator output based on a sample signal from the controller 60. Memory can be a sampling circuit (for example a switch and a parasitic or explicit capacitor) or a digital memory circuit (a latch or a flip-flop). In one embodiment, the memory will be a sampling circuit and each pixel will have one or two one-bit memories.

A conditional reset circuit R1 is used to reset the voltage Vdiff. The condition for reset is a combination of the state of the memorized comparator output held in the memory 50 and a reset signal applied by the controller 60.

In other implementations, the comparator A1 and the memory 50 can be located in peripheral circuits (outside the pixel circuit). Nevertheless, the controller 60 which applies threshold signals to the comparator A1, sends control signals to memory 50 and selects times when the conditional reset circuit R1 becomes active will typically be located only in the peripheral circuits to control all of the pixels of the pixel array EBPA with a common threshold Vb and GlobalReset signals.

The peripheral circuits also typically contain the readout circuit RO, which reads the content of the memory 50, determines if the light intensity for a given pixel has increased, decreased, or unchanged, and sends the output (computed from the current memory value) to a processor.

The pixel circuit 100 and controller 60 operate as follows.

A change in light intensity received by the photosensor PD will translate to a change in photoreceptor signal Vpr. When the reset circuit R1 is not conducting, the changes in Vpr will be reflected also in the voltage Vdiff at a comparator node at the inverting input (−) to the comparator A1. This occurs because the voltage across the memory capacitor C1 stays constant.

At times selected by the controller 60, the comparator A1 compares the voltage at the comparator node at the second terminal of the memory capacitor C1 (Vdiff) to a threshold voltage Vb (from controller) applied to the non-inverting input (+) of the comparator A1.

The controller 60 operates the pixel memory 50 to store the comparator output Vcomp. The memory 50 is typically implemented as part of the pixel circuit 100 as shown. In other embodiments, however, the memory 50 is implemented as part of column logic circuit (peripheral circuit, one per each column of the pixel array).

For Off events, Vdiff is lower than the threshold Vb, the comparator output is high, and this level is stored in the memory. This means a decrease is detected.

For ON event, a low comparator output means an increase in illumination. So the readout RO must know the memory content and which threshold was applied.

If the state of the stored comparator output held in the memory 50 indicates a change in light intensity AND the global reset signal GlobalReset signal from the controller 60 is active, the conditional reset circuit R1 is conducting. Here "AND" indicates the logical AND operator. With the conditional reset circuit R1 in a conductive state, the voltage at the comparator node at the inverting input of the comparator A1 (Vdiff) is reset to a known level. Thus, it stores the current photoreceptor signal Vpr on the memory capacitor C1.

Figure 3:
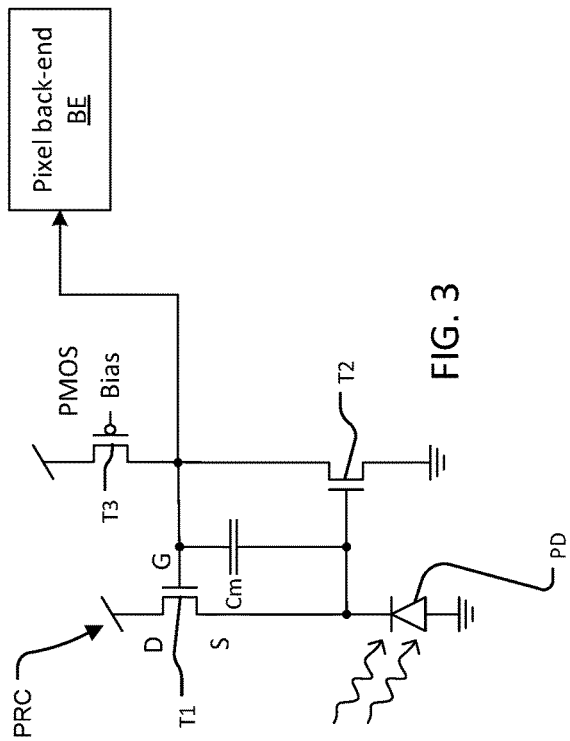
FIG. 3 is a circuit diagram showing an example of a widely used logarithmic front-end circuit with the parasitic capacitance Cm.

FIG. 3 shows an exemplary front end of an event-based vision sensor pixel.

In more detail, the photoreceptor circuit PRC comprises a first NMOS transistor T1 and a second NMOS transistor T2. The gate of transistor T2 is connected to the source of transistor T1, and the cathode of the photodiode PD. The gate of transistor T1 is connected to the drain of transistor T2 and the drain of a biasing PMOS transistor T3 and this node is also the output to the backend BE.

As such, this front end generally experiences a delay from light input change to event generation. The capacitance Cm (which is usually an unavoidable parasitic capacitance) is the main reason for the delay. Other parasitic capacitances can influence the delay as well, however.

The delay is inversely proportional to the current in the photodiode PD, and proportional to Cm.

For a fixed voltage over the photodiode PD, the current in the photodiode is proportional to the light intensity falling on each pixel.

Different delays between pixels that are illuminated differently, and other sensors like an inertial measurement unit (IMU) of the larger system, can pose difficulties to the software processing the data.

The present approach concerns equalizing the delays between differently illuminated pixels. This approach is taken because the delay has physical reasons and cannot be prevented.

There are two general avenues to implementing delay equalization:

Add variable delay after the frontend, Events from pixels with high illumination have to be delayed longer than pixels with medium illumination with a delay circuit for the pixel array.

Adjust the bandwidth of the front-end circuit to equalize the delay with circuits in each pixel. This means that at least one of the physical parameters that influence the delay has to be adjusted as a function of the light intensity.

FIG. 4 shows an embodiment of the photoreceptor circuit PRC with a delay capability that directly controls the delay where it occurs, in the pixel.

An explicit variable capacitor Cm is controlled as a function of the light intensity. Specifically, a pixel control circuit PCC monitors the output from the photoreceptor circuit PRC and then controls the capacitance of the variable capacitor Cm.

To increase the delay in high illumination scenario, Cm has to be increased. The additional benefit of increasing Cm at high illumination is that the circuit is more stable.

It should be noted that the delay may not necessarily be perfectly equalized for all possible illumination values with such an embodiment. The illumination can vary over several orders of magnitude, and it is difficult to realize a variable capacitor that can be varied over such a large range. This applies also to the embodiments shown in FIGS. 5 and 6. However, even a partial equalization can be very useful.

FIG. 5 shows another embodiment of the photoreceptor circuit PRC with a delay capability that, instead of directly controlling Cm, controls a resistor (implemented by a MOSFET NMOS transistor T4) that is series-connected to Cm. In general, this is easier to implement than directly controlling Cm. By controlling the gate voltage of transistor T4 with the control circuit PCC, the drain-source resistance of T4 is changed. In such an embodiment, for high illumination the resistance of T4 should be low, which equals a high gate voltage, while for low illumination the resistance of T4 should be high, which equals a low gate voltage on T4. The gate voltage on T4 may thus follow the output voltage Vpr of the PRC, potentially amplified and/or shifted using a level-shifter or source-follower.

FIG. 6 shows another embodiment of the photoreceptor circuit PRC with a delay capability that combines principles from the embodiments of FIGS. 4 and 5. Depending on the light level, different cap-resistor series connections are enabled. Specifically, two MOSFET NMOS transistor T5 and T6 are series-connected to respective capacitances Cm1, Cm2. The pixel control circuit PCC monitors the output from the photoreceptor circuit PRC and then controls the capacitance by switching transistor T5 and T6 to selective enable the two capacitances Cm1, Cm2. This circuit could also be implemented with more than two capacitors Cm.

FIG. 7 shows an embodiment that selectively adds delay with a digital delay circuit DL. The digital delay circuit DL is controlled based on an assessment or reading representing the light intensity at the output node of the photoreceptor circuit PRC. The reading is created by an analog to digital converter ADC that digitizes the light intensity reported by the photoreceptor circuit PRC. The detected intensity is then used to control the delay applied by the digital delay circuit DL.

One possible implementation involves count time-bins when using a pixel as described in WIPO Publication No. WO2018/122800 A1 and U.S. Pat. Publication No. US 2018/0189959 A1. When the threshold is crossed, the analog to digital converter (ADC) is used to define starting value of counter. Then, when counter reaches zero, event is communicated.

FIG. 8 shows an embodiment that selectively add delay with analog delay circuit ADL. The analog digital delay ADL is controlled based on an assessment or reading representing the light intensity at the output node of the photoreceptor circuit PRC. This is performed by an analog control circuit ACC.

FIG. 9 shows an example of an analog delay circuit ADL for use in the embodiment of FIG. 8. It employs a starved inverter with a capacitor that will add a delay to the digital signal from the input to the output. By changing the bias-voltage BIAS, the delay of the circuit can be adjusted over a large range by the analog control circuit ACC.

Figure 10:
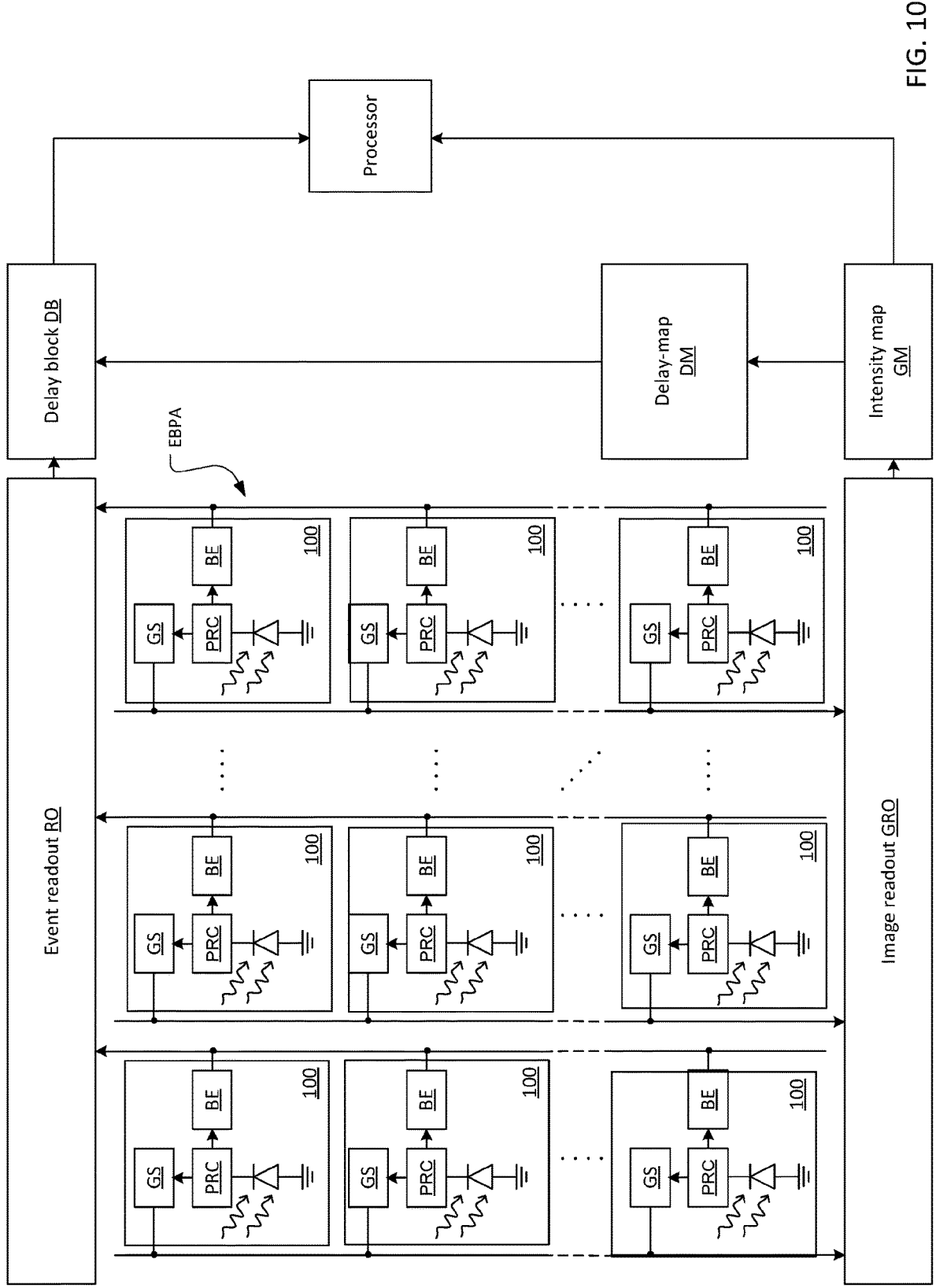
FIG. 10 is a schematic diagram showing an event based pixel array according to the present invention.

FIG. 10 shows an event based pixel array. It applied in cases where the pixel circuit is as proposed in U.S. Pub. No. US 2014/0326854 A1, which is incorporated herein by this reference in its entirety. It also applied to arrays where a similar circuit is used that combines images (gray scale images or color images) and events.

The image value at each pixel location is used for adding a delay as a function of the intensity value. Specifically, each pixel comprises a circuit GS for resolving the level illumination received by each pixel and detected by its photodiode PD. It could be a monochromatic or color (RGB) or any other color filter arrangement. In addition, each pixel 100 also includes the photoreceptor circuit PRC, and the back-end BE of the pixel for revolving ON and OFF events.

In more detail, events are readout of the event-based pixel array EBPA by the event readout RO as described previously.

In addition, the detected illumination of each pixel 100 is additionally readout by the image readout GRO. This results in an image that is stored in a map GM. The image is then used by a delay map circuit DM that calculates or looks-up a corresponding delay associated with the illumination for each pixel. This delay is then applied on a per-pixel basis to the event data by the delay circuit block DB.

On the other hand, if a pixel circuit is used as proposed in PCT/IB2017/058526 or similar is used, sensor time resolution may be adapted dependent on global illumination.

Figure 11C:
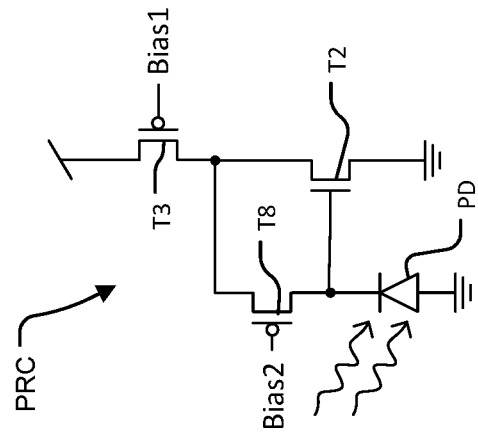
FIGS. 11A, 11B, and 11C are circuit diagrams showing examples of alternative front-end circuits.
Figure 11B:
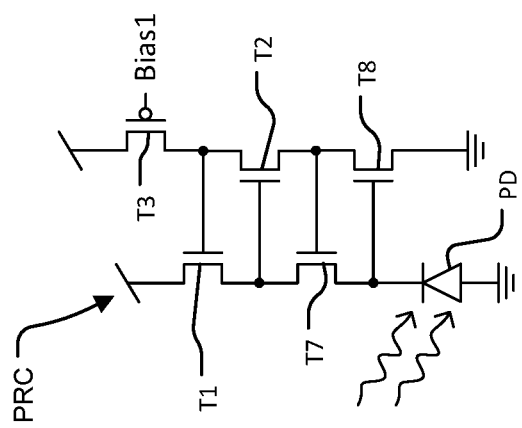
Figure 11A:
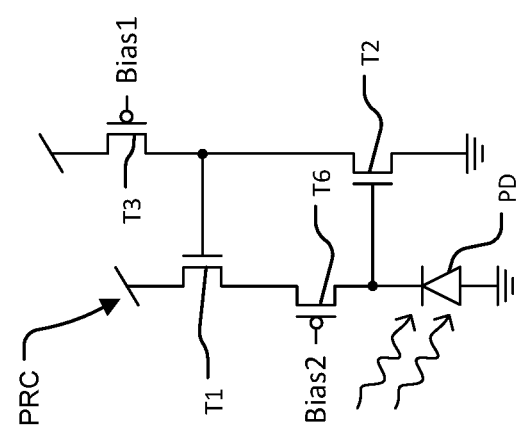

FIGS. 11A, 11B, and 11C show different examples of alternative front-end circuits that could be used with the previously described embodiment.

FIG. 11A shows a photoreceptor circuit PRC with an extra PMOS feedback transistor T6.

FIG. 11B shows a photoreceptor circuit PRC with two more transistors T7 and T8.

FIG. 11C shows a photoreceptor circuit PRC with a PMOS feedback transistor T8.

While this invention has been particularly shown and described with references to preferred embodiments thereof, it will be understood by those skilled in the art that various changes in form and details may be made therein without departing from the scope of the invention encompassed by the appended claims.

What is claimed is:

1. An event-based pixel sensor, comprising:
    an event-based pixel array for detecting events associated with changes in illumination; and
    one or more circuits that equalize the delays between pixels, wherein the one or more circuits include a digital delay circuit.

2. A method of operation of an event-based pixel sensor, the method comprising:
    detecting events associated with changes in illumination in an event-based pixel array; and
    controlling the delays between pixels with digital delay circuits.

3. A method of operation of an event-based pixel sensor, the method comprising:
    detecting events associated with changes in illumination in an event-based pixel array; and
    controlling the delays between pixels with a delay block that applies delays to event data readout from the event based pixel array, wherein the delay block is controlled based on gray scale image readout from the event based pixel array.

* * * * *